(12) United States Patent
Wagner et al.

(10) Patent No.: US 10,875,510 B2
(45) Date of Patent: Dec. 29, 2020

(54) METHOD FOR CONTROLLING AN ELECTRONICALLY SLIP-CONTROLLABLE POWER BRAKING SYSTEM

(71) Applicant: Robert Bosch GmbH, Stuttgart (DE)

(72) Inventors: Jens Wagner, Untergruppenbach (DE); Matthias Kranich, Grossbottwar (DE); Nicholas Taubitz, West Bloomfield, MI (US); Reid Collins, Novi, MI (US); Stefan Zahariev, Ilsfeld (DE); Alfred Strehle, Fellbach (DE)

(73) Assignee: Robert Bosch GmbH, Stuttgart (DE)

( * ) Notice: Subject to any disclaimer, the term of this patent is extended or adjusted under 35 U.S.C. 154(b) by 8 days.

(21) Appl. No.: 16/393,335

(22) Filed: Apr. 24, 2019

(65) Prior Publication Data

US 2019/0359191 A1 Nov. 28, 2019

(30) Foreign Application Priority Data

May 24, 2018 (DE) .......................... 10 2018 208 211

(51) Int. Cl.
*B60T 8/1761* (2006.01)
*B60T 13/68* (2006.01)
(Continued)

(52) U.S. Cl.
CPC .......... *B60T 8/17616* (2013.01); *B60T 8/321* (2013.01); *B60T 8/34* (2013.01); *B60T 8/72* (2013.01); *B60T 13/686* (2013.01); *B60T 2240/00* (2013.01); *B60T 2250/04* (2013.01); *B60T 2270/10* (2013.01)

(58) Field of Classification Search
CPC .... B60T 8/17616; B60T 13/686; B60T 8/321; B60T 2270/10; B60T 8/72; B60T 2250/04; B60T 2240/00; B60T 8/34; B60T 13/148; B60T 7/042; B60T 8/00; B60T 8/17;
(Continued)

(56) References Cited

U.S. PATENT DOCUMENTS

| | | | | |
|---|---|---|---|---|
| 4,858,438 | A | * | 8/1989 | Douillet .................. B60T 13/14 60/566 |
| 6,412,881 | B1 | * | 7/2002 | Isono ...................... B60T 8/367 188/356 |

(Continued)

FOREIGN PATENT DOCUMENTS

DE 102017212360 A1 * 1/2019

*Primary Examiner* — Pamela Rodriguez
(74) *Attorney, Agent, or Firm* — Norton Rose Fulbright US LLP; Gerard Messina

(57) ABSTRACT

A method for controlling an electronically slip-controllable power braking system of a motor vehicle. Power braking systems are equipped with a plunger unit, which includes a plunger piston accommodated in a plunger cylinder and delimiting a working chamber, for generating brake pressure in brake circuits. This plunger piston is actuatable by an electronically activatable drive in a pressure buildup direction or in the opposing spatial direction thereto in a pressure reducing direction. A time-limited drive of the plunger piston takes place in the pressure reducing direction as soon as an actual brake pressure generated by the plunger unit has reached a predefinable setpoint brake pressure and a decoupling of a wheel brake and the plunger unit from an associated brake circuit has taken place.

6 Claims, 2 Drawing Sheets

(51) Int. Cl.
  *B60T 8/32*    (2006.01)
  *B60T 8/72*    (2006.01)
  *B60T 8/34*    (2006.01)

(58) Field of Classification Search
  CPC .... B60T 8/4081; B60T 13/146; B60T 13/662; B60T 13/745; B60T 2201/03; B60T 2201/122
  USPC .............. 303/119.1, 20, 113.1, 113.3, 114.1; 188/156, 158, 162, 355, 358
  See application file for complete search history.

(56)     References Cited

U.S. PATENT DOCUMENTS

| 10,457,259 | B2* | 10/2019 | Wagner | B60T 13/745 |
| 2015/0051805 | A1* | 2/2015 | Mayer | B60T 13/145 |
| | | | | 701/70 |
| 2017/0327098 | A1* | 11/2017 | Leiber | B60T 7/042 |
| 2020/0047728 | A1* | 2/2020 | Wagner | B60T 8/4081 |

* cited by examiner

METHOD FOR CONTROLLING AN ELECTRONICALLY SLIP-CONTROLLABLE POWER BRAKING SYSTEM

CROSS REFERENCE

The present application claims the benefit under 35 U.S.C. § 119 of German Patent Application No. DE 102018208211.1 filed on May 24, 2018, which is expressly incorporated herein by reference in its entirety.

FIELD

The present invention is directed to a method for controlling an electronically slip-controllable power braking system.

BACKGROUND INFORMATION

Power braking systems are understood hereafter as braking systems in which, under normal operating conditions, i.e., in malfunction-free operation, the brake pressure is not provided by the driver by muscle power, but rather by a pressure generator driven by external power. The drive of the pressure generator takes place as a function of a braking intention, which may be specified, for example, by the driver via an actuating unit of the braking system and/or by an electronic control unit on the basis of existing measurement data of vehicle-side sensor systems.

A conventional electronically slip-controllable power braking system is shown in FIG. 1 on the basis of a pressure medium circuit diagram. The latter illustrates the individual components of this power braking system on the basis of switching symbols and the pressure medium connections provided between these components.

Specifically, the conventional power braking system includes a master brake cylinder 10, which may be actuated by a driver, for example, via a brake pedal 12. Two brake circuits 14, 16 independent of one another are connected to this master brake cylinder 10 to conduct pressure medium. The connections of master brake cylinder 10 to the two brake circuits 14, 16 are each controllable via a circuit separating valve 18, 20. The latter are designed as electronically controllable, normally-open, 2/2-way switching valves.

Two wheel brakes 22 through 28 are each supplied with pressure medium via each brake circuit 14, 16. Brake circuits 14, 16 each branch for this purpose into a first and a second circuit branch 30, 32 or 34, 36, respectively, in each of which one of wheel brakes 22 through 28 is located. A so-called pressure buildup valve 38, 40, 42, 44 is provided in each case to control the pressure medium connection of one of circuit branches 30 through 36 to associated wheel brake 22 through 28. These pressure buildup valves 38 through 44 are designed as electronically controllable, normally-open, 2/2-way proportional valves. A check valve actuated by pressure medium is connected in parallel to each of them, which blocks in the flow direction from master brake cylinder 10 to wheel brake 22 through 28 and opens in the opposite direction thereto.

Each circuit branch 30 through 36 is contacted with a shared return line 46 directly upstream of each wheel brake 22 through 28. So-called pressure reducing valves 50, 52, 54, 56, in electronically activatable, normally-closed, 2/2-way switching valve design, control the pressure medium connections of circuit branches 30 through 36 to this return line 46 and thus a pressure medium connection between each wheel brake 22 through 28 and a reservoir 48 of the power braking system, which is situated at the end of this return line 46.

Pressure buildup valve 38 through 44 and pressure reducing valve 50 through 56 of each wheel brake 22 through 28 form a pressure modulation unit with one another in each case, via which the brake pressure at one of wheel brakes 22 through 28 is adaptable at each individual wheel to the slip conditions which presently prevail at the particular associated wheel.

Furthermore, the power braking system includes an electronically drivable pressure generator, which builds up a brake pressure in both brake circuits as needed. This pressure generator is designed as a plunger unit 60, in which a plunger piston 62 is drivable via an interconnected gearing 64 by an electric drive motor 66 to perform a translatory movement in the direction of a longitudinal axis of a plunger cylinder 68. Plunger piston 62 delimits a working chamber 70 inside plunger cylinder 68, the volume of which decreases (pressure buildup direction) or increases (pressure reducing direction) as a function of the movement direction of plunger piston 62. Two plunger control valves 72, 74 provided downstream from plunger unit 60 control pressure medium connections of plunger unit 60 to brake circuits 14, 16. These plunger control valves 72, 74 are electronically controllable, normally-closed, 2/2-way switching valves.

Working chamber 70 of plunger unit 60 is connected via two supply lines 76, 78 to return line 46 of the power braking system and is supplied via these lines with pressure medium from reservoir 48. The two supply lines 76, 78 open in the direction of the longitudinal axis of plunger cylinder 68 axially spaced apart from one another into its working chamber 70. A first supply line 76 situated at the closed first end of working chamber 70 is controlled by a spring-loaded check valve, which prevents a pressure medium discharge from working chamber 70 in the direction of reservoir 48 as soon as driven plunger piston 62 has closed second supply line 78, which faces toward the piston, with its circumference.

Furthermore, the power braking system is also equipped with a simulator unit 80. It is connected to one of brake circuits 14, 16 between master brake cylinder 10 and one of circuit separating valves 18, 20 and includes a simulator piston 84, which is situated in a cylinder 82 and to which pressure medium may be applied under actuation pressure against the force of a piston restoring element 86. This simulator piston 84 delimits a simulator chamber 88, which has a connection to conduct pressure medium to one of the chambers of master brake cylinder 10. A simulator control valve 90 is located in the pressure medium connection from master brake cylinder 10 to simulator chamber 88. This valve is designed as an electronically controllable, normally-closed, 2/2-way switching valve. As soon as simulator control valve 90 is open and circuit separating valves 18, 20 are closed in each case by corresponding electronic activation and an actuation of master brake cylinder 10 takes place via brake pedal 12, pressure medium is displaced out of the chamber of master brake cylinder 10 into simulator unit 80 and buffered therein without brake pressure being built up in brake circuits 14, 16.

With a reset of the actuation of master brake cylinder 10, the pressure medium flows out of simulator unit 80 back into the chamber of master brake cylinder 10.

The power braking system is equipped with multiple sensor systems for its control. A first sensor system 92 is coupled to the actuating unit or brake pedal 12 and detects a braking intention on the basis of an actuating travel which is delivered to this brake pedal 12 by the driver. The brake pressure prevailing in one of brake circuits 14, 16 is detected by a second sensor system 94. This second sensor system 94 is connected to brake circuits 14, 16 between plunger unit 60 and plunger control valves 72, 74. A third sensor system 96 measures the current strength with which drive motor 66 of plunger unit 60 is energized, a fourth sensor system 98 measures a rotation angle at which a driveshaft of drive motor 66 rotates, and a fifth sensor system includes wheel speed sensors 100 through 106, one of which is situated on each wheel of the vehicle. The wheel peripheral velocities may be ascertained from the wheel speeds via the known wheel circumference.

Explained sensor systems 92 through 106 transmit their measurement data to an electronic control unit 108 of the power braking system, where these measurement data are further processed. With the proviso that the brake pressure of the individual wheel brakes is to be adapted to the particular braking intention and, in the process taking into consideration the slip conditions prevailing at each of the wheels, electronic control unit 108 outputs activation signals to explained valves 18, 20, 38 through 44, 50 through 56, 72, 74, 90 and to drive motor 66 of plunger unit 60.

To build up brake pressure in wheel brakes 22 through 28, for example, plunger control valves 72, 74 and pressure buildup valves 38 through 44 are opened, and circuit separating valves 18, 20 and pressure reducing valves 50 through 56 are closed. Moreover, plunger unit 60 is driven in the pressure buildup direction. Otherwise, i.e., for a pressure reduction, pressure buildup valves 38 through 44 are closed and pressure reducing valves 50 through 56 are opened, so that pressure medium drains out of wheel brakes 22 through 28 toward reservoir 48 as a result of the existing pressure gradient.

Discharged pressure medium is therefore no longer available for subsequent brake pressure buildups by plunger unit 60, however. The pressure medium reserved in working chamber 70 of plunger cylinder 68 is successively reduced in the course of multiple successive pressure buildup and pressure reduction cycles and therefore has to be replenished from time to time. This pressure medium replenishment typically takes place only when the residual volume in working chamber 70 has fallen below a previously established minimal value stored in electronic control unit 108. This minimal value of pressure medium present in working chamber 70 is necessary, inter alia, to be able to carry out a wheel-specific brake pressure adaptation during a brake application as needed. The pressure medium replenishment is carried out by the drive of plunger unit 60 in the pressure reducing direction with previously closed plunger control valves 72, 74. With the movement of plunger piston 62 in the pressure reducing direction, a partial vacuum forms in working chamber 70 of plunger unit 60, due to which pressure medium flows out of reservoir 48 via the check valve, which opens in this flow direction, of supply line 76 into working chamber 70.

Plunger unit 60 is necessarily not available for a brake pressure buildup in brake circuits 14, 16 for the duration of the volume replenishment. Volume replenishments are therefore carried preferably rarely and extremely rapidly so as not to impair the vehicle stability and the vehicle deceleration during a brake application in progress.

The volume of pressure medium storable in plunger unit 60 is limited by the mechanical space available to plunger unit 60. Furthermore, the volume of working chamber 70 is dimensioned as a function of the volume accommodation and the brake power of wheel brakes 22 through 28 of the vehicle.

SUMMARY

An example control method in accordance with the present invention may offer the advantage that an existing vehicle braking system may be equipped with a plunger unit of more compact dimensions, and therefore requires a smaller overall volume, and may ultimately be provided more cost-effectively.

Alternatively thereto, using a plunger unit having unchanged dimensions, an existing vehicle braking system may also be used in vehicles which are equipped with higher-performance, i.e., more voluminous wheel brakes in relation thereto.

In both cases, parts costs and material costs are saved by the application of the downsizing principle to the hydromechanical design of a plunger unit.

Further advantages or advantageous refinements of the present invention result from the description herein.

BRIEF DESCRIPTION OF THE DRAWINGS

Example embodiment of the present invention are shown in the figures and are explained in detail below.

DETAILED DESCRIPTION OF EXAMPLE EMBODIMENTS

Figure 1:
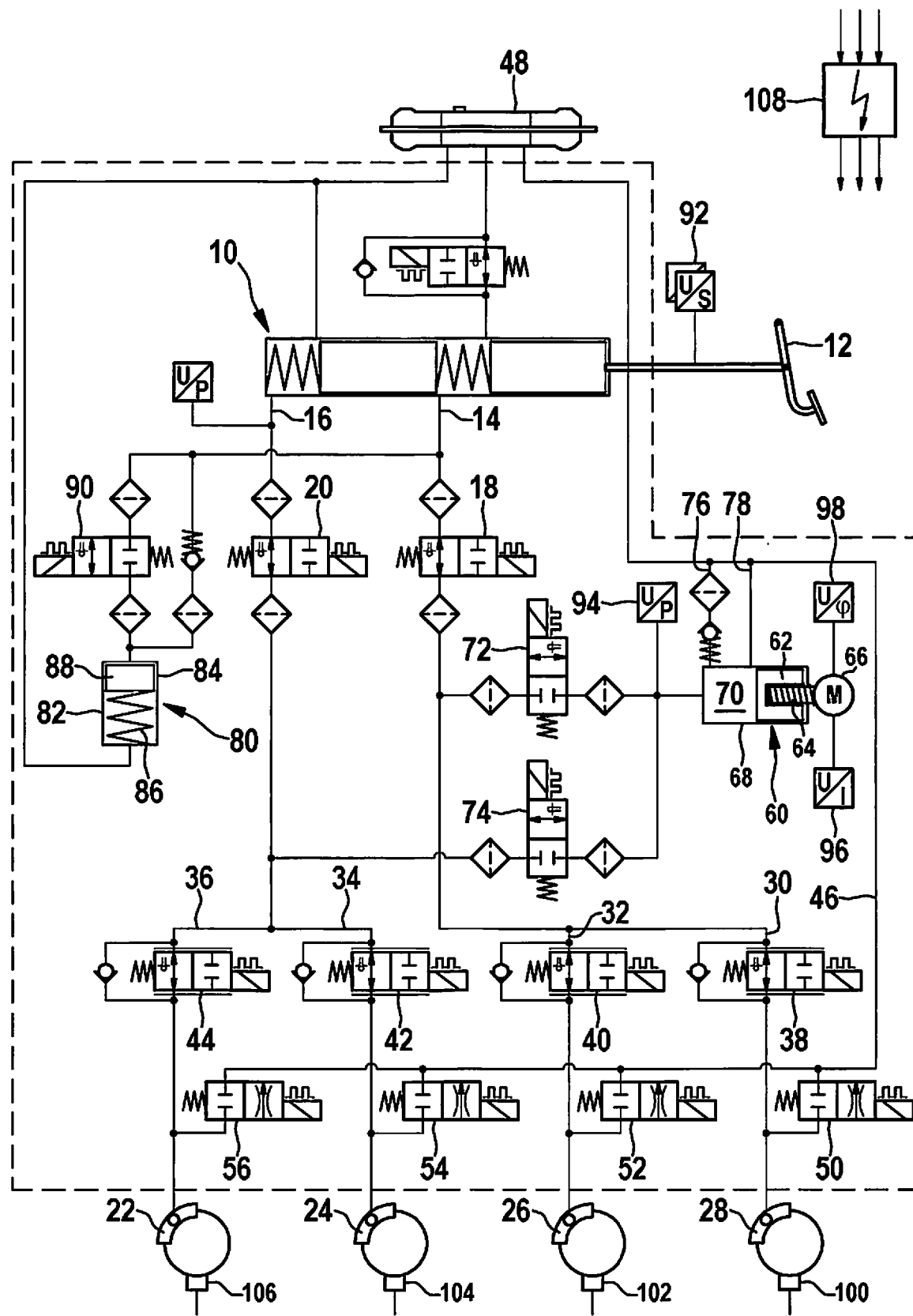
FIG. 1 shows the pressure-medium-conducting layout of the electronically slip-controllable power braking system, which was discussed above and on which the present invention is based.
Figure 2:
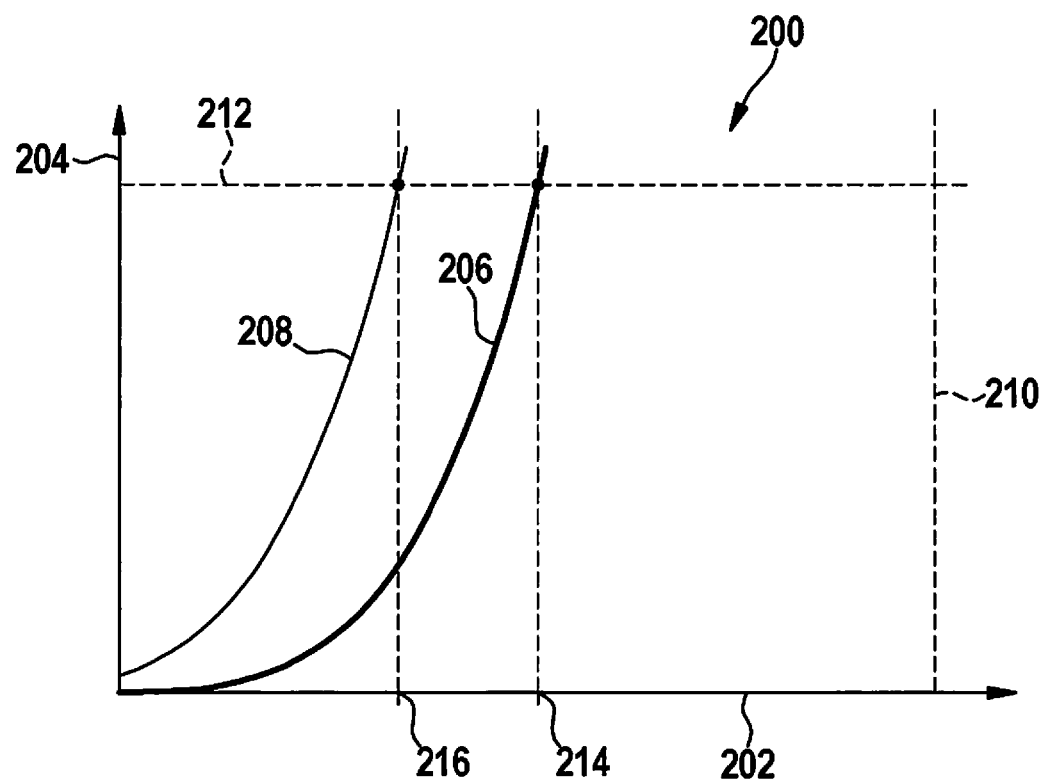
FIG. 2 shows a diagram including multiple pressure/volume characteristic curves of a braking system which result when the plunger piston of the plunger unit is driven by its drive in the pressure buildup direction.

In diagram 200 of FIG. 2, the volume of working chamber 70 of plunger unit 60 is plotted on X axis 202 and the pressure generated by this plunger unit 60 in one of brake circuits 14, 16 of the power braking system is plotted on Y axis 204. The characteristic curves shown thus indicate pressure/volume characteristic curve 206, 208 of a plunger unit 60 which results when plunger piston 62 is actuated by drive motor 66 in the pressure buildup direction, i.e., in the direction of a shrinking working chamber 70.

The distance along X axis 202 from Y axis 204 to a vertical line 210 at the right end of diagram 200 illustrates the maximum volume (100%) of working chamber 70 of plunger unit 60, i.e., the volume of working chamber 70 at the beginning of a movement of plunger piston 62 by its drive motor 66.

A dashed horizontal line 212 at the upper end of diagram 200 indicates a braking intention, or a setpoint brake pressure to be set by plunger unit 60, respectively. This setpoint brake pressure is specified either by the driver actuating brake pedal 12 of power braking system and/or by electronic control unit 108 in the case of an automatic brake application, which is to be carried out independently of the driver.

Plunger piston 62 displaces pressure medium out of working chamber 70 of plunger unit 60 into brake circuits 14, 16 by electrical activation of drive motor 66 of plunger unit 60 in the pressure buildup direction and the volume of this working chamber 70 therefore decreases continuously. In return, the brake pressure continuously rises in brake circuits 14, 16 of the power braking system from the original atmospheric pressure. The setpoint brake pressure (horizontal line 212) is reached when plunger piston 62 in plunger cylinder 68 has moved into position 214. Parabolically curved pressure-volume characteristic curve 206 intersects horizontal line 212 here. The distance from position 214 on X axis 202 up to vertical line 210 at the right end of diagram 200 indicates the remaining residual volume of working chamber 70 of plunger unit 60. It may be used as needed to carry out a pressure control on individual wheels and is only still a fraction, in diagram 200, for example, approximately 50%, of the originally provided volume of working chamber 70.

After the setpoint brake pressure has been reached, pressure buildup valves 38 through 44 are activated by electronic control unit 48 until further notice in such a way that they switch from their passage position into their blocking position and thus confine the brake pressure in wheel brakes 22 through 28. If plunger control valves 72, 74 are moved into their blocking position parallel thereto and plunger piston 62 is actuated by drive motor 66 in the pressure reducing direction, i.e., in the direction of working chamber 70 becoming larger, due to this movement of plunger piston 62 in working chamber 70, a pressure results which is less than the atmospheric pressure prevailing in reservoir 48. The pressure gradient at the check valve of supply line 76 opens this check valve and pressure medium from reservoir 48 flows into enlarging working chamber 70 of plunger unit 60. In plunger unit 60, the stored pressure medium volume increases from 50% up to this point, for example, back to 70%, for example, of its original volume and is available there for subsequent brake applications. Plunger piston 62 has moved from position 214 into position 216. The larger volume of working chamber 70 in position 216 is readable in diagram 200 on the basis of the distance from vertical line 210, which has become greater in relation to position 214. Characteristic curve 208 corresponds in its profile to characteristic curve 206, but is plotted once again at another point of diagram 200 due to the position shift of plunger piston 62.

Due to the explained volume replenishment, a plunger unit 60 may control a larger number of successive pressure buildup procedures until reaching the minimal volume of its working chamber 70 before a required volume replenishment has to be carried out. Accordingly, plunger unit 60 is available for brake pressure control over a greater fraction of its operating time. Alternatively, an existing plunger unit 60 may be used to supply higher-performance wheel brakes, i.e., wheel brakes which have a greater demand for pressure medium, without a separately adapted, larger-dimensioned plunger unit 60 being used for this purpose.

The volume replenishment of working chamber 70 of plunger unit 60 takes place, as explained, following a completed setting of a specified setpoint brake pressure by plunger unit 60. It is unimportant for carrying out the volume replenishment whether working chamber 70 of plunger unit 60 has already reached the fixed minimum value at this point in time or not. The volume replenishment may be triggered in brake applications without wheel-specific pressure control or also at the beginning of brake applications with wheel-specific brake pressure control. In the case of wheel-specific brake applications, however, a suitable triggering time is to be selected for the volume replenishment.

Figure 3:
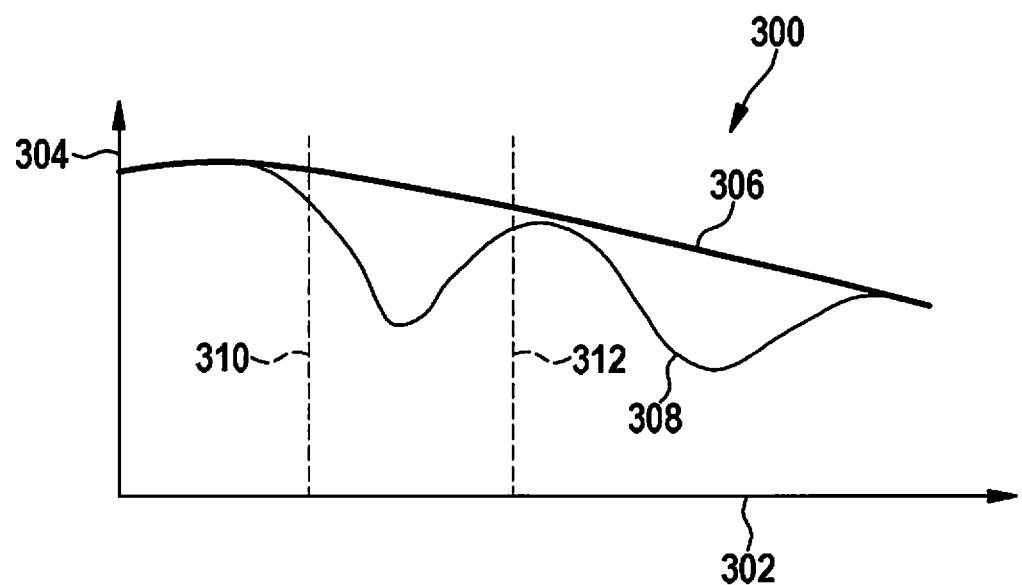
FIG. 3 shows the curve of the vehicle speed and the speed of the wheels at the circumference during a brake application with wheel-specific brake pressure control, for example, a brake application with antilock braking control is shown over time.

This suitable triggering time during a brake application with wheel-specific pressure control is illustrated on the basis of the diagram according to FIG. 3. Diagram 300 shows X axis 302 as the time axis and Y axis 304 as a velocity axis. The plotted first characteristic curve 306 indicates the profile of the vehicle speed of a braked vehicle and second characteristic curve 308 indicates the speed of the wheels at the circumference of a braked wheel of this vehicle. At the beginning of the brake application shown, the vehicle speed and the speed of the wheels at the circumference are initially equal, thereafter the vehicle speed decreases continuously, so that first characteristic curve 306 is characterized by a continuous curved profile. The speed of the wheels at the circumference shown (second characteristic curve 308), in contrast, has a cyclic, wavy profile, since unstable rolling conditions, for example, because of the prevailing slip conditions, exist at the affected wheel. This wheel is thus initially decelerated significantly more strongly than the overall vehicle until the speed of the wheels at the circumference finally decreases enough that the wheel threatens to lock up. A risk of locking and/or a wheel which only still rotates very slowly is detected by wheel speed sensors 100 through 106 and transmitted as electronic information to electronic control unit 108. Electronic control unit 108 thereupon moves pressure buildup valve 38 through 44 of the affected wheel into its blocking position and opens pressure reducing valve 50 through 56 to discharge pressure medium from affected wheel brake 22 through 28 into reservoir 48 and thus reduce the applied brake pressure. A gradual acceleration of the rotational movement of the wheel accompanies the reduction of the brake pressure and thus a renewed increase of the speed of the wheels at the circumference, until the vehicle speed and the speed of the wheels at the circumference have approached one another again or are at least approximately equal. Subsequently thereto, the explained cycle begins due to a further application of the brake pressure still prevailing in brake circuits 14, 16 to wheel brakes 22 through 28. For this purpose, wheel brakes 22 through 28 are again connected to brake circuits 14, 16 to conduct pressure medium by opening pressure buildup valves 38 through 44.

By way of a comparison of the speeds of vehicle and wheel during a brake application in progress with wheel-specific pressure control in electronic control unit 108, braking phases are detectable in which a relatively large deviation exists between vehicle speed (first characteristic curve 306) and speed of the wheels at the circumference (second characteristic curve 308) or, in other words, braking phases during which unstable rolling conditions exist at one or multiple wheels. Such a braking phase is apparent in diagram 300 between the two plotted vertical lines 310 and 312. During such braking phases, a brake pressure buildup does not take place in brake circuits 14, 16 or in one of wheel brakes 22 through 28 and therefore an actuation of plunger unit 60 does not occur. Inactive plunger unit 60 may therefore be decoupled from brake circuits 14, 16 by a withdrawal of the electronic activation of plunger control valves 72, 74 and simultaneously plunger piston 62 may be driven by electronic control unit 108 in the pressure reducing direction without these measures having an effect on the pressure conditions in brake circuits 14, 16 or in wheel brakes 22 through 28. Unstable rolling states at one or multiple wheels of the vehicle accordingly suggest that a volume replenishment of plunger unit 60 be performed.

As soon as vehicle speed (first characteristic curve 306) and speed of the wheels at the circumference (second characteristic curve 308) have equalized with one another again in the relevant braking phase and therefore stable rolling conditions are established again at the affected wheel, the volume replenishment of plunger unit 60 is ended. For this purpose, plunger control valves 72, 74 and pressure buildup valves 38 through 44 are opened by appropriate activation of electronic control unit 108 and plunger piston 62 is possibly driven in the pressure buildup direction again for a subsequent brake pressure buildup in brake circuits 14, 16. As a function of the duration available between vertical lines 310 and 312, a partial or complete filling of working chamber 70 with pressure medium may take place due to the drive of plunger unit 60 in the pressure reducing direction. However, the filling only takes place when a minimum filling duration is available. In general, the time window available for the volume replenishment is not sufficient to fill up working chamber 70 with pressure medium back to 100%. Nonetheless, on the basis of the provided method, the operating time of plunger unit 60 up to which the minimum volume of working chamber 70 is reached and a pressure medium replenishment necessarily has to be carried out may be significantly extended in relation to the related art.

Of course, modifications or additions to the described exemplary embodiment are possible without departing from the basic embodiments of the present invention.

What is claimed is:

1. A method for controlling an electronically slip-controllable power braking system for a motor vehicle, the power braking system being equipped with a unit for at least indirectly specifying a setpoint brake pressure, a plunger unit, which, for generating an actual brake pressure in a brake circuit of the vehicle braking system, includes a displaceable plunger piston accommodated in a plunger cylinder which delimits a working chamber, the plunger piston being displaceable by an electronically controllable drive in a pressure buildup direction or in the opposite spatial direction thereto, in a pressure reducing direction, a wheel brake, which is controllably coupled to the brake circuit and to which the actual brake pressure may be applied, and an electronic control unit, to activate the drive of the plunger unit and to control the coupling of the wheel brake to the brake circuit to adapt the actual brake pressure to the setpoint brake pressure in consideration of the slip conditions prevailing at a wheel associated with the wheel brake, the method comprising:

with the aid of a corresponding activation of the drive by the electronic control unit, actuating the plunger unit in the pressure reducing direction as soon as the actual brake pressure generated by the plunger unit has reached the predefined setpoint brake pressure and a decoupling of the wheel brake and the plunger unit from the brake circuit has been carried out.

2. The method as recited in claim 1, wherein the decoupling of the wheel brake from the brake circuit is carried out by the electronic control unit by electronic activation of a pressure buildup valve, which is associated with the wheel brake and by which a buildup of brake pressure in the wheel brake is controllable.

3. The method as recited in claim 1, wherein a decoupling of the plunger unit from the brake circuit is carried out by the electronic control unit by a withdrawal of an electronic activation of plunger control valves, using which a pressure medium connection of the plunger unit to the brake circuit is controllable.

4. The method as recited in claim 1, wherein the drive of the plunger unit in the pressure reducing direction is carried out when an unstable rolling behavior at a wheel associated with the wheel brake is established by the electronic control unit.

5. The method as recited in claim 4, wherein the unstable rolling behavior of the wheel may be established by the electronic control unit based on a comparison between a vehicle speed and a speed of the wheel at a circumference when a deviation between the vehicle speed and the speed of the wheel at the circumference is established which exceeds a limiting value which is established in the electronic control unit.

6. The method as recited in claim 1, wherein the plunger piston of the plunger unit is driven in the pressure reducing direction when wheel-specific control of the brake pressure is not carried out at the wheel brake.

* * * * *